June 16, 1959 R. D. PARKER 2,890,774
MAGNETIC FLUID CLUTCH WITH SPEED CONTROL THEREFOR
Filed Feb. 1, 1956 4 Sheets-Sheet 1
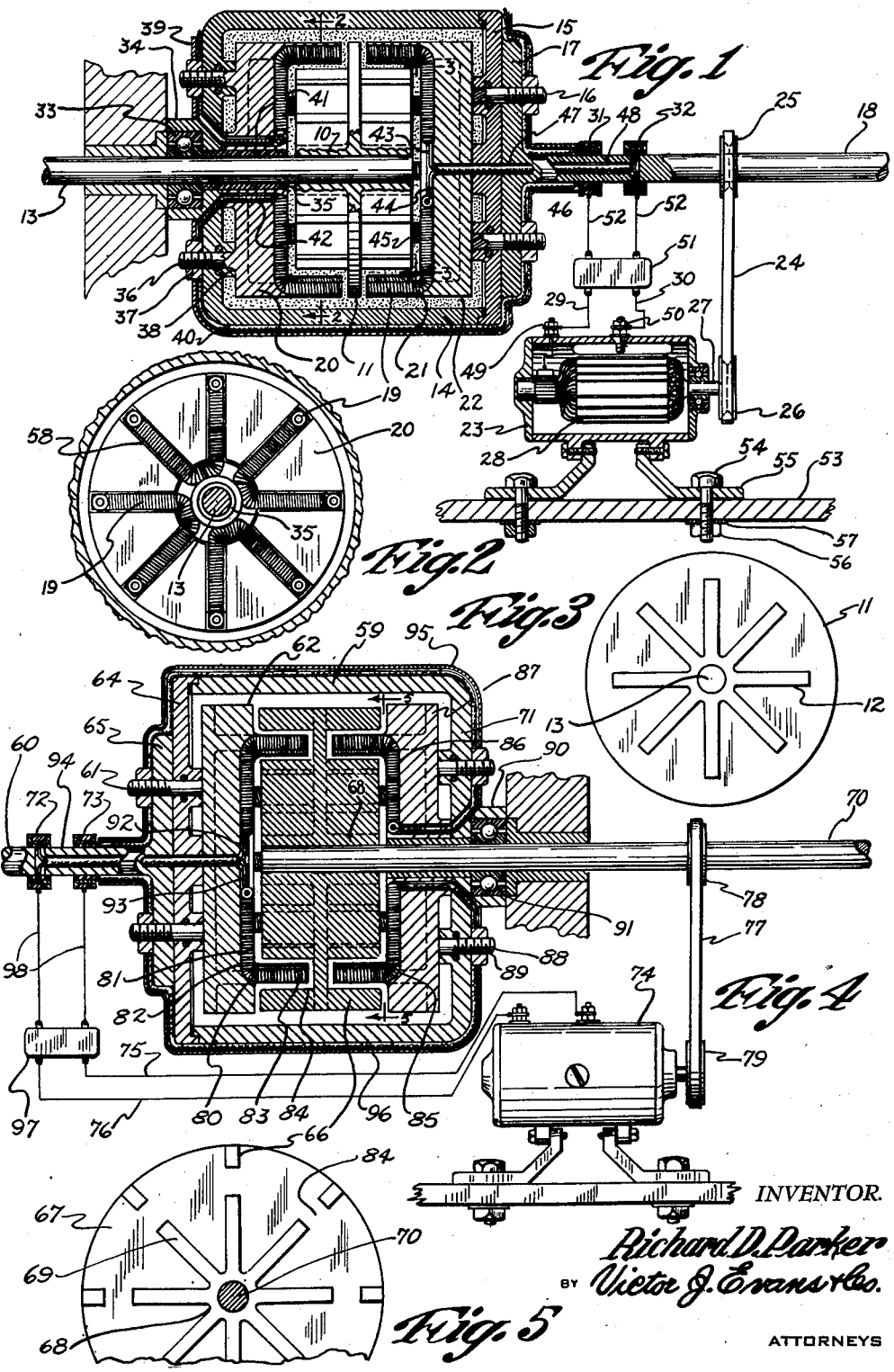
INVENTOR.
Richard D. Parker
BY Victor J. Evans & Co.
ATTORNEYS June 16, 1959
R. D. PARKER
2,890,774
MAGNETIC FLUID CLUTCH WITH SPEED CONTROL THEREFOR
Filed Feb. 1, 1956
4 Sheets-Sheet 2
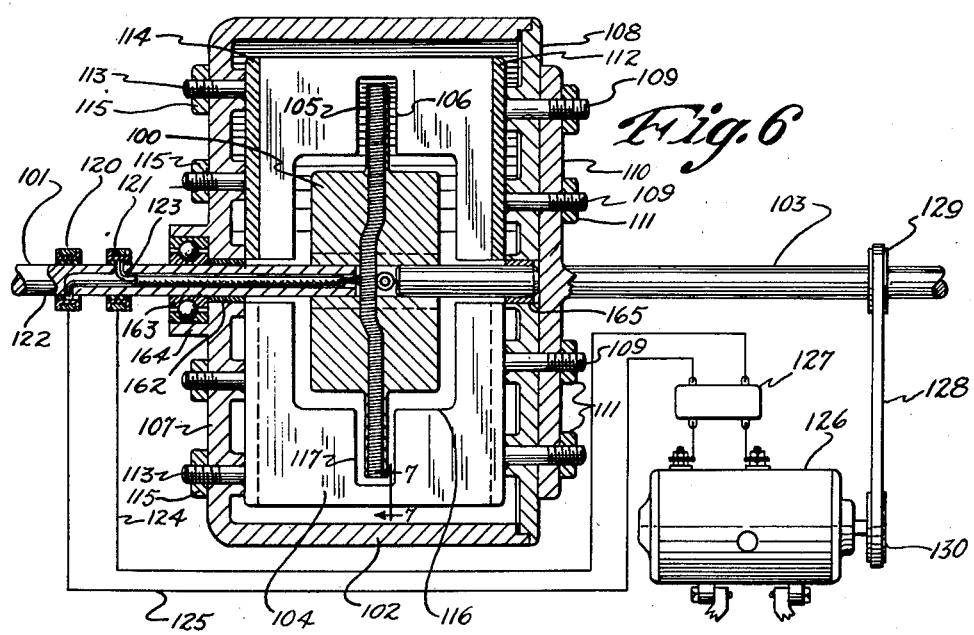
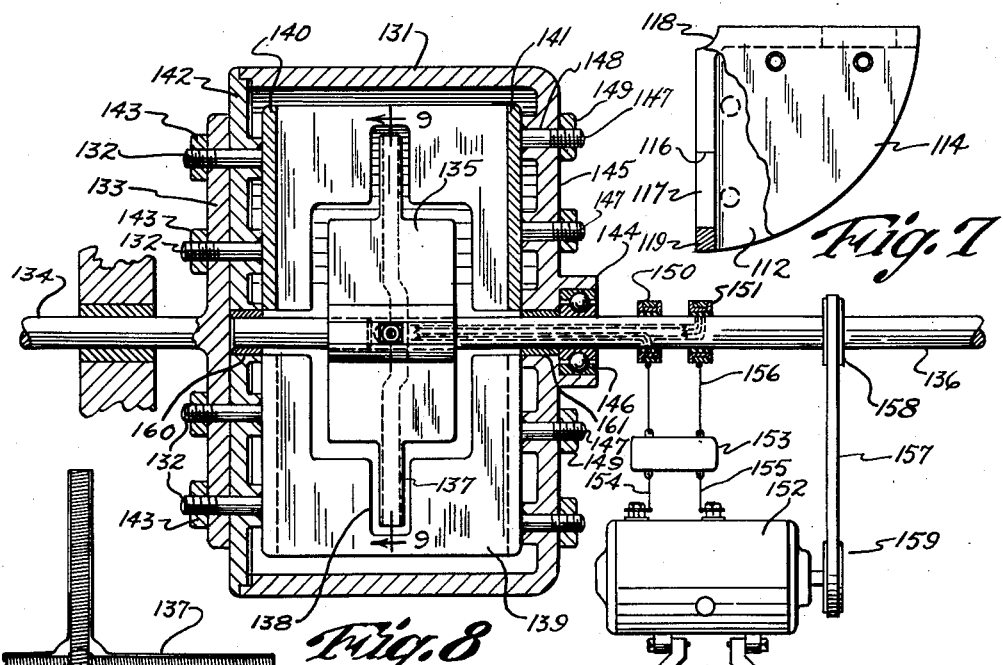
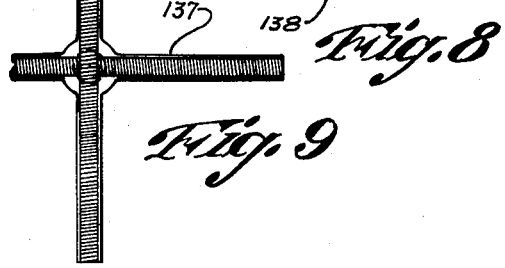
INVENTOR.
Richard D. Parker
BY Victor J. Evans & Co.
ATTORNEYS June 16, 1959 R. D. PARKER 2,890,774
MAGNETIC FLUID CLUTCH WITH SPEED CONTROL THEREFOR
Filed Feb. 1, 1956 4 Sheets-Sheet 3
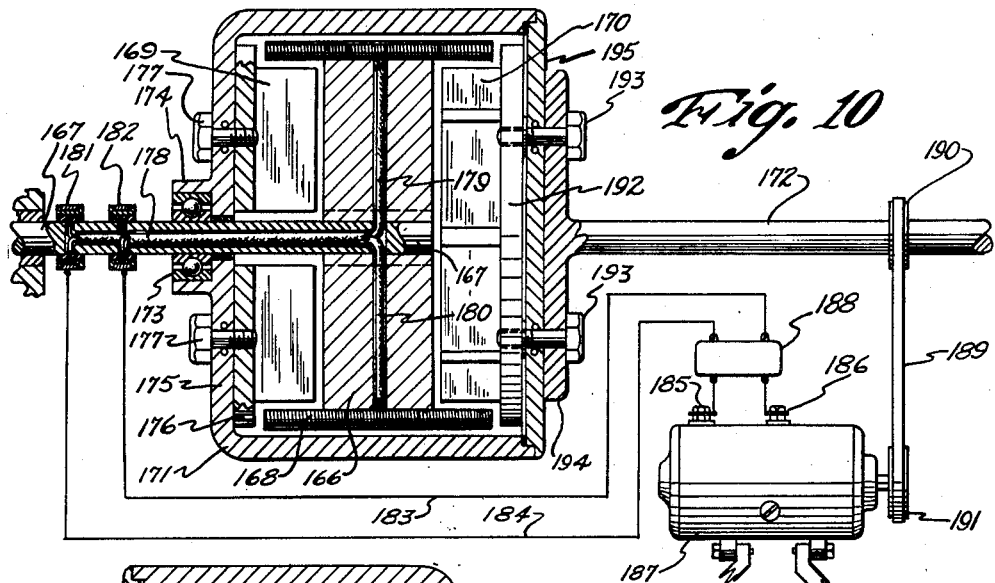
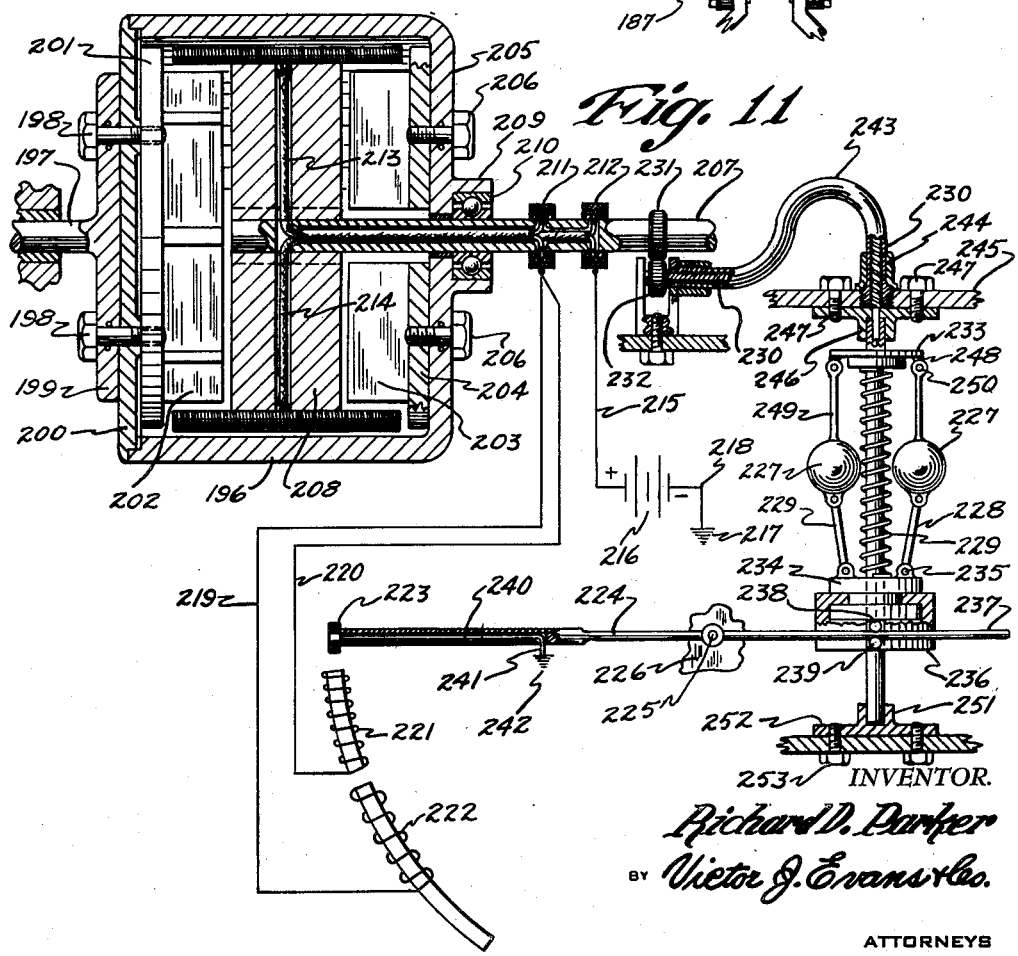
INVENTOR.
Richard D. Parker
BY Victor J. Evans & Co.
ATTORNEYS

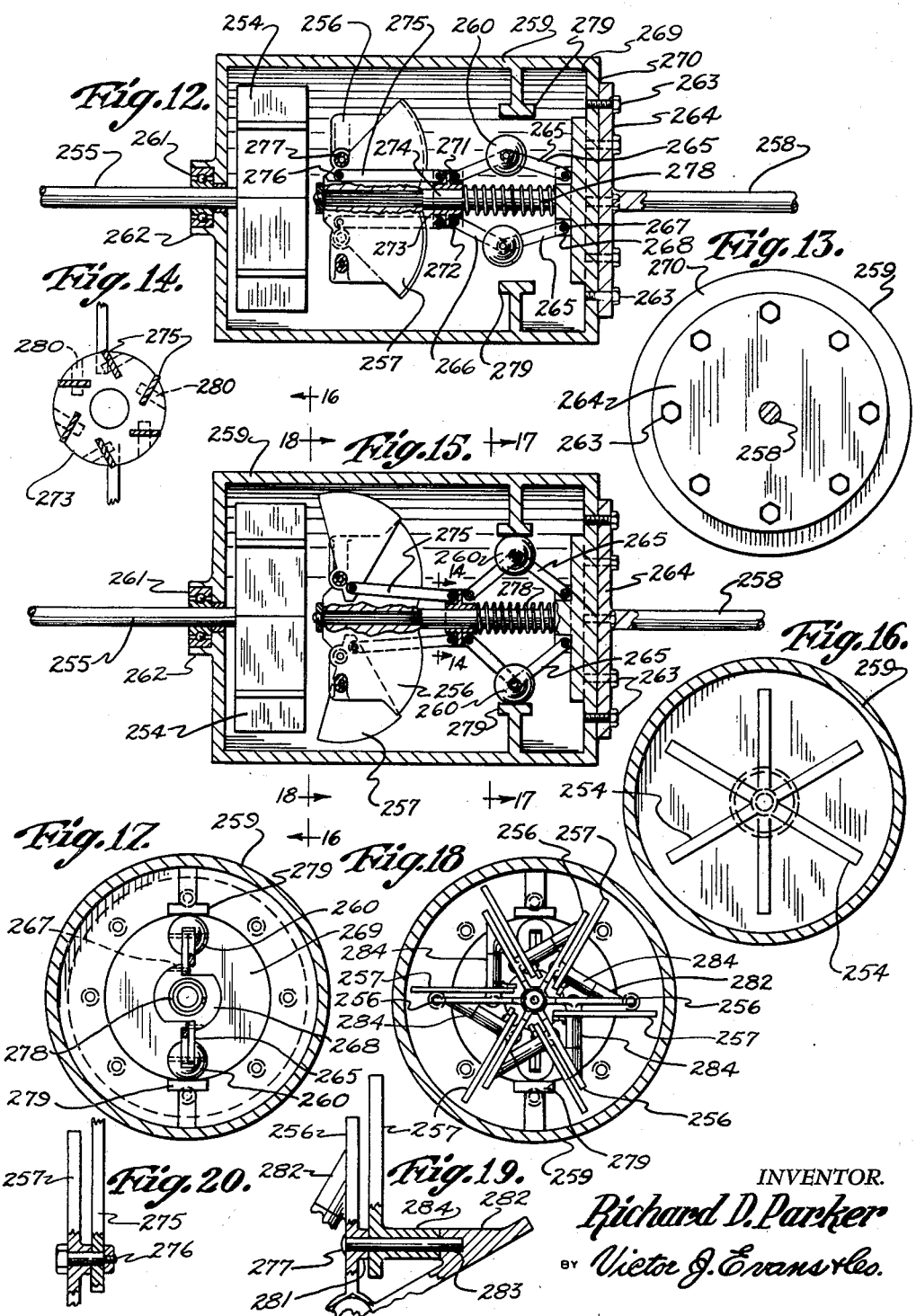
June 16, 1959  R. D. PARKER  2,890,774
MAGNETIC FLUID CLUTCH WITH SPEED CONTROL THEREFOR
Filed Feb. 1, 1956  4 Sheets-Sheet 4
INVENTOR.
Richard D. Parker
BY Victor J. Evans & Co.
ATTORNEYS United States Patent Office 2,890,774
Patented June 16, 1959

2,890,774

MAGNETIC FLUID CLUTCH WITH SPEED CONTROL THEREFOR

Richard D. Parker, Harrisburg, Ill.

Application February 1, 1956, Serial No. 562,768

3 Claims. (Cl. 192—21.5)

This invention relates to fluid driving elements used primarily as transmissions for motor vehicles, and in particular a fluid coupling for actuating a driven shaft by a driving shaft in which an impeller on the driving shaft drives an impeller on the driven shaft with the power of the driving shaft being transmitted to the driven shaft by a liquid and with the liquid containing metal particles adapted to be influenced by electro-magnets in combination with the impeller of the driven shaft to intensify the density of the liquid to facilitate the transmission of power from the impeller of the driving shaft to the impeller of the driven shaft.

The purpose of this invention is to provide automatic control of means for varying the density of liquid of a fluid coupling to provide more efficient transmission of power from a driving impeller to a driven impeller: Thus making possible in motor vehicles a smooth automatic transfer of power which can be so adjusted that it attains the economy equivalent to a straight through shaft at comparatively low vehicle speed.

With the conventional type of fluid drive in which power is transmitted from a driving shaft to a driven shaft through the medium of a fluid an impeller on a driving shaft circulates liquid in the cylindrical casing and as the speed of the liquid increases an impeller on the driven shaft is actuated by the liquid to drive the driven shaft. The power developed by the driven shaft is dependent upon the circulation of the liquid in a housing in which an impeller of the driven shaft is positioned and the circulation of the liquid is dependent upon an impeller carried by the driving shaft and also positioned in the housing. With this thought in mind this invention contemplates using metal particles in the liquid of a fluid coupling and providing electro-magnets in the coupling wherein upon energization of the electro-magnets the metal particles are influenced to accumulate around poles of the magnets providing a coagulated mass that retards rotation of an impeller there through and that is adapted, when the magnets are completely energized, to cause the impeller of the driven shaft to rotate at the same speed as the impeller of the driving shaft.

The object of this invention is, therefore, to provide means for incorporating electro-magnets in a fluid coupling whereby metal particles suspended in liquid of the coupling are adapted to intensify the density of liquid around the impellers in combination with the electro-magnets, which are automatically controlled by arrangements which will be made clear later.

Another object of the invention is to provide a fluid coupling having electro-magnets and metal particles suspended in liquid in combination therewith in which electric current for the electro-magnets is generated by a moving part of the coupling.

Another important object of the invention is to provide a fluid coupling having electro-magnets incorporated therein in which the electro-magnets are mounted in close proximity to rotors or impellers of the coupling.

A further object of the invention is to provide a fluid coupling having electro-magnets energized by a generator in combination with the coupling and positioned to influence metal particles in a liquid in the coupling in which the device is of a simple and economical construction.

With these and other objects and advantages in view the invention embodies a fluid coupling having a cylindrical housing, a driving shaft extended into one end of the housing, a driven shaft extended from the opposite end of the housing, impellers positioned in the housing and mounted on the driving and driven shafts, a liquid having metal particles suspended therein positioned in the housing, electro-magnets also positioned in the housing, and a generator connected to the electro-magnets through the center of a shaft of the coupling and adapted to supply current to the electro-magnets upon rotation of the driven parts of the device.

Other features and advantages of the invention will appear from the following description taken in connection with the drawings, wherein:

Figure 1 is a longitudinal section through the improved fluid coupling showing one rotor or impeller positioned in a housing and mounted on a driving shaft: It is thus the driving impeller. The driven impeller in this figure consists of radially disposed blades which are mounted in the surrounding housing and are integrally connected to this housing. A driven shaft integrally connected to the housing and extended therefrom and a generator driven by a belt from the driven shaft and connected through the housing and center of the driven shaft to electro-magnets in the housing.

Figure 2 is a cross section through the housing taken on line 2—2 of Fig. 1 illustrating the positions of the electromagnets therein, each section of which is attached to the front edge of one of the radially disposed blades of the driven impeller mentioned in Figure 1.

Figure 3 is an end elevational view taken on line 3—3 of Fig. 1 of an impeller or rotor positioned in the housing and mounted on the driving shaft.

Figure 4 is a longitudinal section through a fluid coupling, similar to that shown in Fig. 1 illustrating a modification wherein the housing is integrally connected to the driving shaft and wherein a rotor or impeller therein which includes blades with T-shaped ends is mounted on a driven shaft extended from the housing.

Figure 5 is an end elevational view taken on line 5—5 on Fig. 4 showing the T-shaped rotor positioned in the housing.

Figure 6 is a longitudinal section through a fluid coupling, similar to that shown in Fig. 1 illustrating another modification wherein the electro-magnets are carried by a rotor positioned on the end of the driving shaft and radially disposed blades are mounted in the surrounding housing which is integrally connected to the driven shaft.

Figure 7 is a view taken on line 7—7 of Fig. 6 showing one of the blades, part of one of the flanges of the blade being broken away showing the inner structure thereof.

Figure 8 is a longitudinal section through a fluid coupling showing a further modification wherein the housing of the design shown in Fig. 6 is carried by the driving shaft and the rotor in which the electro-magnets are positioned is mounted on the driven shaft.

Figure 9 is a cross section taken on line 9—9 of Fig. 8 illustrating the electro-magnets of the design shown in Fig. 8 with the housing and blades therein omitted.

Figure 10 is a longitudinal section through a fluid coupling, also similar to that shown in Fig. 1, illustrating a further modification wherein impellers at the ends are integrally connected to the housing and driven shaft and a rotor with electro-magnets extended longitudinally from the peripheral surface is carried by a driving shaft extended into the housing, the rotor being positioned between the impellers in the ends of the housing.

Figure 11 is a longitudinal section, similar to that shown in Fig. 10, illustrating a further modification wherein the rotor is carried by the driven shaft and the housing by the driving shaft, and wherein the driven shaft actuates a contact arm through a governor with the arm connected in the circuit of a rheostat for controlling the amount of current supplied to the electro-magnets.

Figure 12 shows a longitudinal section through a fluid coupling in which an impeller mounted on the driving shaft is positioned in a cylindrical housing carried by a driven shaft and in which an impeller having fixed and adjustable blades is also mounted on the driven shaft on which a governor is also provided for extending and retracting the adjustable blades.

Figure 13 is an end elevational view of the coupling shown in Fig. 12.

Figure 14 is a cross section taken on line 14—14 of Fig. 15 illustrating the pivotal mounting of the blades in a hub of the impeller.

Figure 15 is a longitudinal section, similar, to that shown in Fig. 12 illustrating the positions of the parts with the adjustable blades extended.

Figure 16 is a cross section through the coupling shown in Fig. 15 being taken on line 16—16 thereof showing the blades of the impeller of the driving shaft.

Figure 17 is a cross section taken on line 17—17 of Fig. 15 illustrating the arrangement of the governor on the driven shaft.

Figure 18 is a cross section through the housing taken on line 18—18 of Fig. 15 illustrating the mounting of the stationary and adjustable blades.

Figure 19 is a section through the mounting of the stationary and adjustable blades showing a pin upon which the blades are mounted and with part of the impeller broken away.

Figure 20 is a cross section through the pivotal mounting of one of the adjustable blades showing the connection of the blade to a bar extended from the governor.

Referring now to the drawings wherein like reference characters denote corresponding parts the improved fluid coupling of this invention, particularly as illustrated in Fig. 1, includes a rotor or impeller having a hub 10, a centrally positioned annular flange 11 and blades 12 mounted on a driving shaft 13, a housing 14 having a head 15 connected by stud bolts 16 to a flange 17 on a driven shaft 18, L-shaped electro-magnets 19 mounted on impeller blades 20 in one end of the housing and similar electro-magnets 21 mounted on impeller blades 22 positioned in the opposite end of the housing, and a generator 23, driven by a belt 24 trained over a pulley 25 on the driven shaft 18 and also over a pulley 26 on the shaft 27 of the armature 28 and current generated by the generator is carried to the electro-magnets through wires 29 and 30 which are connected to slip rings 31 and 32, respectively positioned on the driven shaft 18.

The driving shaft 13 is rotatably mounted in the housing with a bearing 33 in a hub 34 extended from the closed end of the housing and the shaft also extends through a sleeve 35 which extends through the end of the housing and also between the impeller blades which are secured to the inner surface of the end of the housing with stud bolts 36 on which lock nuts 37 are positioned. The stud bolts are integrally connected to the impeller blades as shown at the point 38.

Wires 39 and 40 connecting terminals of the electrodes 19 to the slip ring 31 extend around the housing and, as illustrated in Fig. 1 the wires extend between impeller blades 20. The wires 39 and 40 extend around the exterior of the housing from the electrodes 19 at one end of the housing to the slip ring 31 and wires 43 and 44, which are connected to the electrodes 21 in the opposite end of the housing extend between impeller blades 22, an opening 46 in the head 15 and an opening 47 in the flange 17 through which the wires extend through an opening 48 in the driven shaft 18 to the slip ring 32. The wires 29 and 30, connecting the slip rings 31 and 32 to the terminals 49 and 50 of the generator are connected to a voltage regulator 51 and short connections 52 are provided between the generator and slip rings. In the design shown the generator is secured to a floor or panel 53 with bolts 54 that extend through flanges 55 and the parts are secured in position with nuts 56 and washers 57.

In this design the electro-magnets are substantially U-shaped, as illustrated in Fig. 2 and arms of the magnets are positioned in radially disposed slots 58.

In the design illustrated in Fig. 4 the fluid coupling is similar to that shown in Fig. 1 except that the housing 59 is mounted on the driving shaft 60 with studs 61 extended between impeller blades 62 through a head 64 and a flange 65 and a rotor or impeller having T-shaped blades with prongs 66 extended transversely across the flange 67 of a hub 68 from which radially disposed blades 69 extend is mounted on the driven shaft 70 that extends through the closed end 71 of the housing. With the parts in this position slip rings 72 and 73, connected to a generator 74 with wires 75 and 76 are positioned on the driving shaft 60 instead of on the driven shaft, as shown in Fig. 1. The generator, however, is driven by a belt 77 that is trained over a pulley 78 on the driven shaft 70 and also over a pulley 79 on the generator.

In the design shown in Fig. 4 each section of the electromagnets is attached to the front edge of one of the radially disposed blades which are mounted to the surrounding housing. The longitudinally disposed ends 83 extended into openings 84 between the T-shaped arms 66 and body of this rotor or impeller. The driven shaft 70 is rotatably mounted in a hub 90 extended from the end wall 71 with a ball bearing 91.

In the design illustrated in Fig. 4 the electro-magnets 81 are connected by wires 92 and 93 to the slip ring 72 through openings 94 in the shaft 60 and similar openings in the head 64 and between impeller blades 62 and the electro-magnets 85 are connected by wires 95 and 96 which extend around the housing, to the slip ring 73. The wires 75 and 76 from the slip ring are connected to a voltage regulator 97 and the wires are provided with short connections 98, as shown.

In the design illustrated in Fig. 6 a fluid coupling is provided wherein a rotor 100 is carried by a driving shaft 101 and a housing 102 is mounted on a driven shaft 103 with impeller blades 104 positioned around the rotor and fixedly mounted in the housing and electro-magnets 105 extended through the rotor are positioned with ends thereof extended into slots 106 of the blades 104.

The housing 102 is provided with a closed end 107 and a head 108 and the head is secured in position with stud bolts 109 that extend through a flange 110 on the driven shaft 103 and that are secured in position with nuts 111. The studs 109 are integral with and extend from end walls 112 of the blades and similar studs 113 which extend from end walls 114 at the opposite end of the housing are secured in position with lock nuts 115. The blades 104 include recesses 116 through which the rotor 100 passes and slots 117 through which extended ends of electro-magnets pass. The inner ends of the blades are provided with arcuate recesses 118 that nest around the driving and driven shafts and outer portions of the blades are connected with relatively narrow webs 119. The end walls 112 and 114 in combination with the blades at the ends are preferably formed in segments, as illustrated in Fig. 7.

In the design shown in Fig. 6 slip rings 120 and 121 are mounted on the driving shaft 101 and these rings are connected by wires 122 and 123 to the electrodes 105 of the rotor 100. The slip rings are also connected by wires 124 and 126, respectively, to a generator 126 and the wires are connected through a voltage regulator 127. The generator is driven from the driven shaft 103 with a belt 128 trained over a pulley 129 on the driven shaft and also over a pulley 130 on the generator.

The fluid coupling illustrated in Fig. 8 is similar to that shown in Fig. 6 except that the housing 131 is mounted by stud bolts 132 on a flange 133 of the driving shaft 134 and the rotor or impeller 135 is carried by the driven shaft 136. The impeller of this design is provided with electro-magnets 137 that extend into slots 138 of blades 139 and the blades are mounted between end walls 140 and 141 which are preferably formed in segments, as shown in Fig. 7.

The studs 132 extended from the end walls 140 extend through a head 142 and also through the flange 133 and the stud bolts and also through the flange 133 and the stud bolts and also the head and flange are clamped together with lock nuts 143.

The driven shaft of the fluid coupling shown in Fig. 8 is rotatably mounted in a hub 144 of the end wall 145 of the housing 131 with the ball bearing 146 and the end walls 141 of the blades are provided with studs 147 that extend through openings 148 in the end wall of the housing and that are secured in position with lock nuts 149.

Also in the design shown in Fig. 8 slip rings 150 and 151 are mounted on the driven shaft 136 and the rings are connected to a generator 152 through a voltage regulator 153 with wires 154 and 155. The wires 154 and 155 are also provided with a short connection 156. The generator 152 is driven from the driven shaft 136 with a belt 157, the belt being trained over a pulley 158 on the driven shaft and also over a pulley 159 on the generator.

The end of the driven shaft 136 that extends into the housing is rotatably mounted in a bearing 160 in the head 142 and, at the opposite side of the housing, the shaft is rotatably mounted with a bearing 161 in the end wall 145. The driving shaft 101 of the design shown in Fig. 6 is rotatably mounted in the housing 102 in a similar manner with the intermediate part of the shaft rotatably mounted with a bearing 162 in the end wall 107 and also with a bearing 163 in a hub 164. The end of the shaft is mounted with a bearing 165 in the head 108, at the opposite side of the housing.

In the design illustrated in Fig. 10 a rotor 166 is carried by a driving shaft 167 and electro-magnets 168 are carried on the ends or periphery of the rotor. The electro-magnets are positioned to travel over vanes 169 and 170 extended from discs 176 and 192 fixedly mounted, in opposite ends of the housing 171 which is mounted on and integral with the driven shaft 172.

The driving shaft 167 is rotatably mounted by a bearing 173 in a hub 174 of an end wall 175 of the housing 171 and the vanes 169, which extend radially from the center of the shaft are carried by the disc 176 which is secured to the end wall 175 of the housing with cap screws 177. The shaft 167 is provided with a bore 178 through which wires 179 and 180 extend, the wires connecting electro-magnets 168 to slip rings 181 and 182 positioned on the driving shaft. The slip rings are connected by wires 183 and 184 to terminals 185 and 186, respectively, of a generator 187, the wires being connected to the generator through a voltage regulator 188. The generator 187 is driven by a belt 189 which is trained over a pulley 190 on the driven shaft 172 and also over a pulley 191 on the shaft of the generator.

The vanes 170 of the fluid coupling shown in Fig. 10 extend from the disc 192 which is secured to the driven shaft 172 with cap screws 193 that extend to a flange 194 on the shaft and also to a head 195 which provides the closure for the housing.

The design illustrated in Fig. 11 is similar to that shown in Fig. 10 except that a housing 196 is mounted on a driving shaft 197 with cap screws 198 which extend through a flange 199 on the shaft, and also through a head 200 providing a closure for the end of the housing and which are threaded into a disc 201 from which blades or vanes 202 extend. Similar vanes 203 are carried by a disc 204 which is secured to the end wall 205 with cap screws 206 and a driven shaft 207 on which a rotor 208 is carried is rotatably mounted in a hub 209 extended from the end wall 205, with a bearing 210.

The rotor 208, of the design shown in Fig. 11 rotates between the vanes 202 and 203 and electro-magnets carried by the periphery of the rotor 208 rotate beyond the ends of the blades or vanes 202 and 203 and as fine metal particles suspended in a liquid in the housing accumulate in the vicinity of the electrodes movement between the vanes and rotor is restricted until the driven shaft 207 rotates at the same speed as that of the driving shaft 197.

The electrodes of the fluid motor shown in Fig. 11 are supplied with current through slip rings 211 and 212 from which wires 213 and 214 extend and with the slip collars connected to a battery, generator, or other source of electric current, current is supplied to the electrodes to eliminate any slip action that may occur between the rotor and vanes. The slip ring 212 is connected by a wire 215 to a battery 216 the opposite terminal of which is connected to a ground 217 with a wire 218 and the slip ring 211 is connected by individual wires, such as the wires 219 and 220 to sections, such as the sections 221 and 222 of a rheostat, the sections being adapted to be engaged by a contact 223 on the end of an arm 224 which is pivotally mounted by a pin 225 on a stationary member 226 and the position of the contact 223 on the coils or bars 221 and 222 is controlled by a governor including weights or balls 227 mounted on spring arms 228 on a stem 229 of a flexible shaft 230 which is operatively connected to the driven shaft 207 by a gear 231 on the driven shaft 207 and to a gear 232 that meshes with the gear 231 and that is positioned on the flexible shaft 230. By this means the flexible shaft drives the shaft 229 and upon rotation of the governor the weights 227 move outwardly whereby with a disc 233 at the upper end of the governor fixedly mounted the collar 234 to which lower ends of the spring arms 228 are pivotally connected with pins 235, is drawn upwardly carrying the bracket 236 upwardly on the shaft 229 and moving the end 237 of the arm 224 upwardly about the pivot 225 so that the contact 223 on the opposite end moves downwardly, contacting the sections of the rheostat. The bracket 236 is provided with pins 238 and 239 between which the end of the lever is positioned and the opposite end of the lever is provided with an opening 240 through which a wire 241 extends for connecting the contact 223 to a ground such as the ground 242.

The flexible shaft or cable 230 extends through a sheaf 243 and the extended end is mounted in a nipple 244 that is threaded into a wall 245. The end of the flexible cable extends through a hub 246 extended from a flange 247 and the flange is secured to the mounting member 245 with cap screws 248. The fixedly mounted disc 233 is provided with ears 248 to which upper ends of the upper arms 249 of the governor are connected with pins 250. The lower end of the shaft or stem 229 is rotatably mounted in a bearing 251 which is secured to a wall or mounting member 252 with cap screws 253.

In the design illustrated in Figs. 12 and 15 a comparatively simple form of the fluid coupling is illustrated wherein a rotor or impeller 254 mounted on the end of a driving shaft 255 and a coacting impeller having stationary blades 256 and movable blades 257 thereon is carried by a driven shaft 258 which is integrally connected to a housing 259 whereby with a fluid in the housing 259 circulated by rotation of the impeller 254 the housing 259 with the impeller 256 integrally connected thereto rotates by the circulation of the fluid and as the speed of the housing increases weights 260 move outwardly drawing the blades 257 outwardly increasing the area impinged by the circulating fluid whereby the driven shaft is rotated by the driving shaft.

The driving shaft 255 of the fluid coupling shown in Fig. 12 is rotatably mounted by a bearing 261 in a hub 262 at one end of the housing and the opposite end of the housing is connected by cap screws 263 in a flange 264 on the end of the driven shaft 258.

The balls or weights of the governor of the design shown in Fig. 12 are mounted by arms 265 in one side and 266 at the other, the arms 265 being mounted by pins 267 on ears 268 on a disc 269 on the inner surface of the end wall 270 of the housing and the arms 266 at the opposite end are pivotally mounted by pins 271 to flanges 272 of a sliding collar 273 on the inner section 274 of the driven shaft 258, and the collar 273 is connected by links 275 to inner ends of the blades 257 by pins 276. With the blades pivotally mounted by pins 277 on the fixed blades 256 sliding movement of the collar 273 draws the pins 276 toward the governor moving extended ends of the blades 257 outwardly, to the position shown in Fig. 15, so that as the speed of the driven shaft 258 increases the balls 260 move outwardly, drawing the blades 257 outwardly and thereby providing greater bearing area to receive the impinging force of the liquid or fluid in the housing. Upon a reduction of the speed a spring 278 in the governor slides the collar 273, drawing the movable blades 257 inwardly to the position shown in Fig. 12. The housing 259 is provided with opposed plates 279 that limit outward movement of the weights 260 preventing the blades 257 contacting the blades of the impeller.

As illustrated in Fig. 14 the links 275 are pivotally mounted by pins 280 in the sliding collar 273 and, as illustrated in Figs. 18 and 19 the adjustable or moving blades 257 are positioned whereby the pins 277 extend from one of the stationary or fixed blades 256 to a following blade with one blade provided with a hub 281 and the other with a boss 282 in which is an opening 283 into which the inner end of the pin 277 is positioned. The movable blades 257 are also provided with hubs 284 by which the blades are pivotally mounted on the pins.

Operation

With the parts assembled as illustrated and described a liquid, such as oil, having metal particles, preferably of soft iron suspended in the oil is positioned in the housing and upon rotation of the driving shaft an impeller either independently mounted on the shaft or positioned in the housing causes the liquid to circulate with the result that an impeller on the driven shaft or in a housing carried by the driven shaft is caused to rotate with the liquid whereby the liquid provides a coupling between the driving and driven elements.

In the designs in which the electro-magnets are used the current is supplied in direct ratio to the speed of the driven shaft. Thus in the initial stage, no current is supplied to the electro-magnets and the device is completely dependent on just the mechanical movement of the liquid to provide a coupling between the driving and the driven elements. When the driven impeller starts rotating, it imparts rotation to the driven shaft which causes the generator or the rheostats to feed current to the electro-magnets which causes the metal particles to be drawn to the poles of the magnets causing an accumulation or mass of metal particles around the driven impeller whereby motion of the impeller of the driving shaft is imparted with greater efficiency to the impeller of the driven shaft. Thus the current is increased to the electro-magnets in direct ratio to the increased speed of the driven shaft and as current is more increased to the electro-magnets a homogeneous mass is obtained that causes the driven shaft to rotate at the same speed as that of the driving shaft. Thus a single completely automatic control is attained.

In the designs in which no electro-magnets are used (refer to Figures 12, 13, 14, 15, 16, 17, 18, and 19). Upon rotation of driving shaft an impeller positioned on the driving shaft causes the liquid to circulate with the result that an impeller on the driven housing is caused to rotate with the liquid whereby the liquid provides a coupling between the driving and the driven elements.

When the driven rotor first starts the centrifugally controlled governor weights are in position nearest the shaft so that the pivotable blades of the driven rotor are in the most retracted position. Then as the liquid imparts motion to the driven impeller the governor weights are caused to shift causing the pivotable driven impeller blades to extend whereby motion of the driving impeller is imparted with greater efficiency to the driven impeller and this extension continues until the pivotable blades of the driven impeller are in their most extended position so that the greatest possible efficiency of motion is imparted from the driving impeller to the driven elements.

The current supplied to the electro-magnets may be controlled by the rheostat or the speed of the generator and the effectiveness of the electro-magnets may also be controlled by the quantity of metal particles carried by the liquid or by the arrangement of the blades of the impellers. The voltage regulator merely provides a top limit to the amount of electricity which the generator will create, which saves burning out the electromagnets, the generator and prevents undue drag on the motor when the vehicle is going at high speed.

The improved fluid coupling of this invention is illustrated in various forms, however, it will be understood that other changes, within the scope of the appended claims, may be made in the design and arrangement of the parts without departing from the spirit of the invention.

What is claimed is:

1. In a fluid coupling, the combination which comprises a cylindrical casing, a driving shaft extended from one end of the casing and on which the casing is carried, a driven shaft rotatably mounted in the casing aligned with the driving shaft and extended from the end of the casing opposite to that from which the driving shaft extends, discs in the casing and mounted on inner surfaces of ends thereof, radially disposed vanes extended from opposed surfaces of the discs mounted in the casing, a rotor in the casing positioned between the discs on which the vanes are positioned and carried by the end of the driven shaft extended into the casing, electro-magnets mounted in combination with the rotor and extended over the vanes of the discs, a fluid with metal particles having magnet attraction therein in the casing, and means for supplying current to the electro-magnets through the driven shaft in which motion is transmitted from the driving shaft to a driven shaft in proportion to the density of the metal particles, and the density is controlled by the speed of the driven shaft, a governor and means connecting the governor to the means for supplying electric current to the electro-magnets in the housing.

2. In a fluid coupling, the combination which comprises a casing, a driving shaft extended from one end of the casing and on which the casing is carried, a driven shaft rotatably mounted in the casing aligned with the driving shaft and extended from the end of the casing opposite to that from which the driving shaft extends, discs having radially disposed blades thereon mounted in the casing, a rotor positioned in the casing between the discs and carried by the end of the driven shaft extended into the casing, electro-magnets mounted in combination with the rotor and extended over the blades of the discs, a fluid with metal particles having magnet attraction suspended therein in the casing, and means for supplying current to the electro-magnets through the driven shaft in which motion is transmitted from the driving shaft to a driven shaft in proportion to the density of the metal particles, and the density is controlled by the speed of the driven shaft, a rheostat, and means connecting the rheostat to the means for supplying electric current to the electro-magnets in the housing.

3. In a fluid coupling, the combination which comprises a driving shaft, a casing integrally connected to the driving shaft and carried thereby, a driven shaft aligned with the driving shaft and rotatably mounted in the casing, a rotor positioned in the center of the casing and carried by the driven shaft, discs having radially disposed blades extended therefrom mounted in the casing and positioned on opposite sides of the rotor, electro-magnet coils carried by the rotor and extended over blades of the discs, a fluid having particles having magnetic attraction suspended therein in the casing, a governor operatively connected to the driven shaft and means, controlled by the governor for supplying electricity through the driven shaft to the electro-magnets in the casing.

References Cited in the file of this patent
UNITED STATES PATENTS

| | | |
|---|---|---|
| 1,901,988 | Rudqvist | Mar. 21, 1933 |
| 2,395,047 | Hanson | Feb. 19, 1946 |
| 2,575,360 | Rabinow | Nov. 20, 1951 |
| 2,643,748 | White | June 30, 1953 |
| 2,661,825 | Winslow | Dec. 8, 1953 |
| 2,685,947 | Votrian | Aug. 19, 1954 |
| 2,695,086 | Parker | Nov. 23, 1954 |
| 2,718,157 | Schaub | Sept. 20, 1955 |
| 2,734,603 | Wakefield | Feb. 14, 1956 |